(12) United States Patent
Xing et al.

(10) Patent No.: US 12,019,233 B2
(45) Date of Patent: Jun. 25, 2024

(54) OPTICAL DEVICE VENTING GAPS FOR EDGE SEALANT AND LAMINATION DAM

(71) Applicant: MAGIC LEAP, INC., Plantation, FL (US)

(72) Inventors: Wendong Xing, Plantation, FL (US); Vikramjit Singh, Pflugerville, TX (US); Neal Paul Ricks, Plantation, FL (US); Jeffrey Dean Schmulen, Austin, TX (US); Emory D. Carroll, Boynton Beach, FL (US); K. Brent Binkley, Plantation, FL (US); Frank Y. Xu, Austin, TX (US); Thomas Mercier, Weston, FL (US); William Hudson Welch, Fort Lauderdale, FL (US); Michael Anthony Klug, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 731 days.

(21) Appl. No.: 17/262,535

(22) PCT Filed: Jul. 22, 2019

(86) PCT No.: PCT/US2019/042804
§ 371 (c)(1),
(2) Date: Jan. 22, 2021

(87) PCT Pub. No.: WO2020/023373
PCT Pub. Date: Jan. 30, 2020

(65) Prior Publication Data
US 2021/0311298 A1 Oct. 7, 2021

Related U.S. Application Data

(60) Provisional application No. 62/702,215, filed on Jul. 23, 2018, provisional application No. 62/702,020, filed on Jul. 23, 2018.

(51) Int. Cl.
G02B 25/00 (2006.01)
G02B 5/20 (2006.01)
G02B 27/00 (2006.01)

(52) U.S. Cl.
CPC .......... *G02B 25/001* (2013.01); *G02B 5/208* (2013.01); *G02B 27/0006* (2013.01); *G02B 27/0081* (2013.01)

(58) Field of Classification Search
CPC ...... G02B 25/001; G02B 5/208; G02B 5/201; G02B 27/0006; G02B 27/0081;
(Continued)

(56) References Cited

U.S. PATENT DOCUMENTS 4,360,015 A 11/1982 Mayer
4,547,037 A 10/1985 Case
(Continued)

FOREIGN PATENT DOCUMENTS

CA 3013957 A1 8/2017
CN 1426439 A 6/2003
(Continued)

OTHER PUBLICATIONS

International Search Report and Written Opinion in related International Appl. No. PCT/US/2019/042804, dated Oct. 10, 2019, 10 pages.
(Continued)

Primary Examiner — Stephone B Allen
Assistant Examiner — Jyotsna V Dabbi
(74) Attorney, Agent, or Firm — Fish & Richardson P.C.

(57) ABSTRACT

An optical device, such as an eyepiece, including multiple layers of waveguides. The optical device can include an edge sealant for reducing light contamination, a lamination dam to restrict the wicking of the edge sealant between layers of the optical device, and venting gap(s) in the sealant
(Continued)

and dam to allow air flow between the exterior and interior of the eyepiece. The gap(s) allow outgassing from the interior of the eyepiece of unreacted polymer and/or accumulated moisture, to prevent defect accumulation caused by chemical reaction of outgassed chemicals with the (e.g., ionic, acidic, etc.) surface of the eyepiece layers. The gap(s) also prevent pressure differences which may physically deform the eyepiece over time.

19 Claims, 6 Drawing Sheets

(58) Field of Classification Search
CPC .. G02B 27/01; G02B 27/0172; G02B 27/017; G02B 27/0176; G02B 27/0018; G02B 2027/0178; G02B 2027/0114; G02B 2027/014; G02B 2027/0174; G02B 6/0053; G02B 6/12009; G02B 6/3676; G02B 6/1221; G02B 6/1223; G02B 6/24; G02B 6/241; G02B 6/0076; G02B 1/14; G02F 1/1339; G02F 2202/28; H10K 50/8426; H10K 50/844; H10K 50/84; H10K 50/841; H10K 50/8428; H10K 59/87; H10K 59/871; H10K 59/8722; H10K 59/8723; H10K 59/873; B32B 2457/20; B32B 7/12; B32B 37/12; B32B 2037/1253; B32B 3/02; B32B 3/06; B32B 3/26; B32B 3/266; B32B 3/30; B32B 17/10899; B32B 17/00
USPC .......................................................... 359/361
See application file for complete search history.

(56) References Cited

U.S. PATENT DOCUMENTS

| | | | |
|---|---|---|---|
| 4,723,953 | A | 2/1988 | Rosenbaum et al. |
| 5,007,977 | A | 4/1991 | Gottschald |
| 5,029,985 | A | 7/1991 | Suzuki et al. |
| 5,210,630 | A | 5/1993 | Heynderickx et al. |
| 5,547,747 | A | 8/1996 | Trokhan et al. |
| 5,556,085 | A | 9/1996 | Cyr |
| 5,931,755 | A | 8/1999 | Mailey et al. |
| 6,165,547 | A | 12/2000 | Leedom |
| 6,456,355 | B1 | 9/2002 | Choi et al. |
| 6,547,940 | B2 | 4/2003 | Aksay et al. |
| 6,972,788 | B1 | 12/2005 | Robertson et al. |
| 7,081,940 | B2 | 7/2006 | Suzuki |
| 7,713,436 | B1 | 5/2010 | Trajkovska-Petkoska et al. |
| 7,718,124 | B2 | 5/2010 | Simmet |
| 8,042,280 | B2 | 10/2011 | Watanabe et al. |
| 8,083,349 | B2 | 12/2011 | Ho et al. |
| 8,357,312 | B2 | 1/2013 | Sun |
| 10,241,260 | B2 | 3/2019 | Miller et al. |
| 11,022,748 | B2 | 6/2021 | Miller et al. |
| 11,198,233 | B2 | 12/2021 | Bhagat et al. |
| 2002/0154264 | A1 | 10/2002 | Suzuki |
| 2002/0181128 | A1 | 12/2002 | Beattie et al. |
| 2003/0220059 | A1 | 11/2003 | Yamasaki |
| 2004/0002179 | A1* | 1/2004 | Barton ............ H01L 27/14685 257/E31.127 |
| 2004/0057683 | A1 | 3/2004 | Shimizu et al. |
| 2005/0155704 | A1 | 7/2005 | Yokajty et al. |
| 2005/0237615 | A1 | 10/2005 | Urey et al. |
| 2006/0204205 | A1 | 9/2006 | Hayashi |
| 2006/0215244 | A1 | 9/2006 | Yosha et al. |
| 2006/0239169 | A1 | 10/2006 | Marumo et al. |
| 2007/0082288 | A1 | 4/2007 | Wright et al. |
| 2007/0103747 | A1 | 5/2007 | Powell et al. |
| 2007/0207560 | A1 | 9/2007 | LeCain et al. |
| 2007/0258691 | A1 | 11/2007 | Charters et al. |
| 2008/0308971 | A1 | 12/2008 | Liu et al. |
| 2009/0053850 | A1 | 2/2009 | Nishida et al. |
| 2009/0256977 | A1 | 10/2009 | Haddock et al. |
| 2010/0202731 | A1 | 8/2010 | Mitsumori |
| 2011/0024862 | A1 | 2/2011 | Tu et al. |
| 2011/0026039 | A1 | 2/2011 | Nimmakayala et al. |
| 2011/0207328 | A1 | 8/2011 | Speakman |
| 2012/0013969 | A1 | 1/2012 | Wang et al. |
| 2012/0212414 | A1 | 8/2012 | Osterhout et al. |
| 2012/0224276 | A1 | 9/2012 | Lin et al. |
| 2013/0174333 | A1 | 7/2013 | Schwartz |
| 2015/0023643 | A1 | 1/2015 | Chartoff et al. |
| 2015/0070602 | A1 | 3/2015 | Fujita |
| 2015/0158240 | A1 | 6/2015 | Haase et al. |
| 2015/0168646 | A1 | 6/2015 | Arai |
| 2015/0277126 | A1 | 10/2015 | Hirano et al. |
| 2016/0116739 | A1 | 4/2016 | Tekolste et al. |
| 2016/0318213 | A1 | 11/2016 | Benson |
| 2017/0191754 | A1 | 7/2017 | Jing et al. |
| 2017/0276944 | A1 | 9/2017 | Kim et al. |
| 2017/0299810 | A1 | 10/2017 | Brouwer et al. |
| 2018/0052276 | A1 | 2/2018 | Klienman et al. |
| 2018/0059320 | A1 | 3/2018 | Miller et al. |
| 2018/0120198 | A1 | 5/2018 | Glasenapp et al. |
| 2018/0250670 | A1 | 9/2018 | Le et al. |
| 2019/0111642 | A1 | 4/2019 | Chang et al. |
| 2019/0170932 | A1 | 6/2019 | Miller et al. |
| 2019/0377200 | A1 | 12/2019 | Xing et al. |

FOREIGN PATENT DOCUMENTS

| | | |
|---|---|---|
| CN | 101589326 A | 11/2009 |
| CN | 102236208 A | 11/2011 |
| CN | 102365567 A | 2/2012 |
| CN | 102928981 A | 2/2013 |
| CN | 103869526 A | 6/2014 |
| CN | 204084009 U | 1/2015 |
| CN | 104950442 A | 9/2015 |
| CN | 105161506 A | 12/2015 |
| JP | 02-143201 A | 6/1990 |
| JP | 11-281837 A | 10/1999 |
| JP | 2002-328377 A | 11/2002 |
| JP | 2003-255207 A | 9/2003 |
| JP | 2004031939 A | 1/2004 |
| JP | 2004272012 A | 9/2004 |
| JP | 2005231960 A | 9/2005 |
| JP | 2007-233303 A | 9/2007 |
| JP | 2009-282488 A | 12/2009 |
| JP | 2012058683 A | 3/2012 |
| JP | 2013-190715 A | 9/2013 |
| JP | 2014-209060 A | 11/2014 |
| JP | 2015-093399 A | 5/2015 |
| JP | 2016107524 A | 6/2016 |
| JP | 2018506068 A | 3/2018 |
| JP | 2020511795 A | 4/2020 |
| KR | 20050069214 A | 7/2005 |
| KR | 2016-0097286 A | 8/2016 |
| WO | 2015/089158 A1 | 6/2015 |
| WO | 2015/128408 A1 | 9/2015 |
| WO | 2016/020643 A1 | 2/2016 |
| WO | 2016/054092 A1 | 4/2016 |

OTHER PUBLICATIONS

Office Action in Chinese Appln. No. 201980082625.8, dated Feb. 11, 2022, 12 pages (with English translation).
CN Office Action in Chinese Application No. 201780051980.X, dated Nov. 20, 2020, 16 pages (with English translation).
EP Extended European Search Report in European Application No. 17844429, dated Aug. 8, 2019, 7 pages.
KR Office Action in Korean Application No. 10-2019-7008606, dated Dec. 3, 2020, 7 pages (with English translation).
PCT International Search Report and Written Opinion in International Appln. No. PCT/US2017/048442, dated Nov. 16, 2017, 14 pages.
PCT International Search Report and Written Opinion in International Appln. No. PCT/US2019/036782, dated Sep. 5, 2019, 8 pages.

(56) References Cited

OTHER PUBLICATIONS

PCT International Search Report and Written Opinion in International Appln. No. PCT/US2019/056519, dated Jan. 10, 2020, 9 pages.
Office Action in Japanese Appln. No. 2021-503589, dated Apr. 4, 2023, 10 pages (with English translation).
Extended European Search Report in European Appln. No. 19873527.6, dated Dec. 14, 2021, 14 pages.
Notice of Allowance in Japanese Appln. No. 2021-520948, dated Nov. 28, 2022, 5 pages (with English translation).
EP Extended Search Report in European Appln. No. 19842348.5, dated Jul. 26, 2021, 8 pages.
JP Office Action in Japanese Appln. No. 2019-510780, dated Aug. 2, 2021, 26 pages (with English translation).
Extended European Search Report in European Appln. No. 23190027.5, dated Oct. 2, 2023, 8 pages.
Notice of Allowance in Japanese Appln. No. 2022-198424, dated Dec. 26, 2023, 5 pages (with English translation).

\* cited by examiner

OPTICAL DEVICE VENTING GAPS FOR EDGE SEALANT AND LAMINATION DAM

CROSS-REFERENCE TO RELATED APPLICATION

This application is a National Phase Application under 35 U.S.C. § 371 and claims the benefit of International Application No. PCT/US2019/042804, entitled "OPTICAL DEVICE VENTING GAPS FOR EDGE SEALANT AND LAMINATION DAM" and filed Jul. 22, 2019, which claims the benefit of U.S. Patent Application No. 62/702,215 entitled "OPTICAL DEVICE VENTING GAPS FOR EDGE SEALANT AND LAMINATION DAM" and filed on Jul. 23, 2018, and U.S. Patent Application No. 62/702,020 entitled "OPTICAL DEVICE VENTING GAPS FOR EDGE SEALANT AND LAMINATION DAM" and filed on Jul. 23, 2018. The entire contents of all foregoing applications are incorporated by reference herein.

BACKGROUND

In optical devices, light can be directed and/or manipulated to achieve a desired effect. For example, in an optical device such as an eyepiece used in a virtual reality interface, visible light can be directed and/or manipulated to provide image data that is perceived by a user. Various types of optical devices may be subjected to testing, during and/or after manufacture, to ensure that the devices are manufactured and/or operate according to desired specifications. For example, in some types of optical devices, it may be advantageous to reduce or eliminate the leakage of light out of the device.

SUMMARY

Embodiments of the present disclosure are generally directed to an optical device with one or more venting gaps. More specifically, embodiments are directed to an optical device, such as an eyepiece that includes multiple optics layers, including an edge sealant along at least a portion of the perimeter of the optical device, a lamination dam to restrict wicking of the edge sealant, and one or more venting gaps in the lamination dam and edge sealant to allow air flow between the interior and exterior of the optical device. The air flow provided by the vent(s) also allows the escape of unreacted polymer residue and moisture from regions between layers of the optical device, when the optical device is subjected to heat and humidity conditions, for example approximately 45-65 degrees Celsius at approximately 80-100% relative humidity.

In general, innovative aspects of the subject matter described in this specification can be included in one or more embodiments of an optical device that includes a plurality of optics layers, an edge sealant arranged along an edge of the optical device across the plurality of optics layers, wherein one or more sealant gaps are present in the edge sealant, and a lamination dam arranged between each pair of adjacent layers of the plurality of optics layers to stop wicking of the edge sealant, between the optics layers, at a distance from the edge of the optical device, wherein one or more dam gaps are present in the lamination dam at one or more positions along the edge that each corresponds to a position of a respective sealant gap to allow air flow between an interior and an exterior of the optical device through the one or more sealant gaps and the one or more dam gaps. Innovative aspects of the subject matter described in this specification can be included in one or more embodiments of an eyepiece including embodiments of the optical device.

One or more embodiments can optionally include one or more of the following features.

In some embodiments, the one or more sealant gaps are located outside a critical region of the edge of the optical device.

In some embodiments, one or more of the sealant gaps has a length along the edge of the optical device exceeding that of the corresponding dam gap.

In some embodiments, one or more of the edge sealant, the lamination dam, and a surface of one of the optics layers of the plurality of optics layers includes or is at least partly composed of a hydrophobic material.

In some embodiments, at least one of the one or more sealant gaps at least partially overlaps with the corresponding one of the one or more dam gaps along the edge of the optical device.

In some embodiments, at least one of the one or more sealant gaps is co-centered with a corresponding one of the one or more dam gaps.

In some embodiments, the edge sealant includes at least two sealant gaps, and the lamination dam includes at least two dam gaps.

In some embodiments, the plurality of optics layers comprises at least three optics layers. The at least three optics layers include a layer to guide red light, a layer to guide green light, and a layer to guide blue light.

In some embodiments, the edge sealant absorbs ultraviolet radiation.

In some embodiments, at least one of the optics layers of the plurality of optics layers includes an orthogonal pupil expander region.

In some embodiments, at least one of the optics layers of the plurality of optics layers includes an exit pupil expander region.

In some embodiments, at least one of the optics layers of the plurality of optics layers includes an ingrating coupling region.

In some embodiments, the one or more sealant gaps and the one or more dam gaps allow for a flow of air between an interior of the optical device and an exterior of the optical device.

In some embodiments, the edge sealant prevents light leakage from an interior to an exterior of the optical device in a transverse direction through the edge of the optical device.

In some embodiments, wherein the edge sealant prevents reflection of light into an interior of the eyepiece.

In some embodiments, a thickness of the edge sealant is in a range between about 430 microns and about 500 microns.

In some embodiments, the thickness of the edge sealant between the edge of the optical device and the lamination dam is about 350 microns.

In some embodiments, a width of the lamination dam is about 500 microns.

In some aspects, an eyepiece includes

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DETAILED DESCRIPTION

Figure 1:
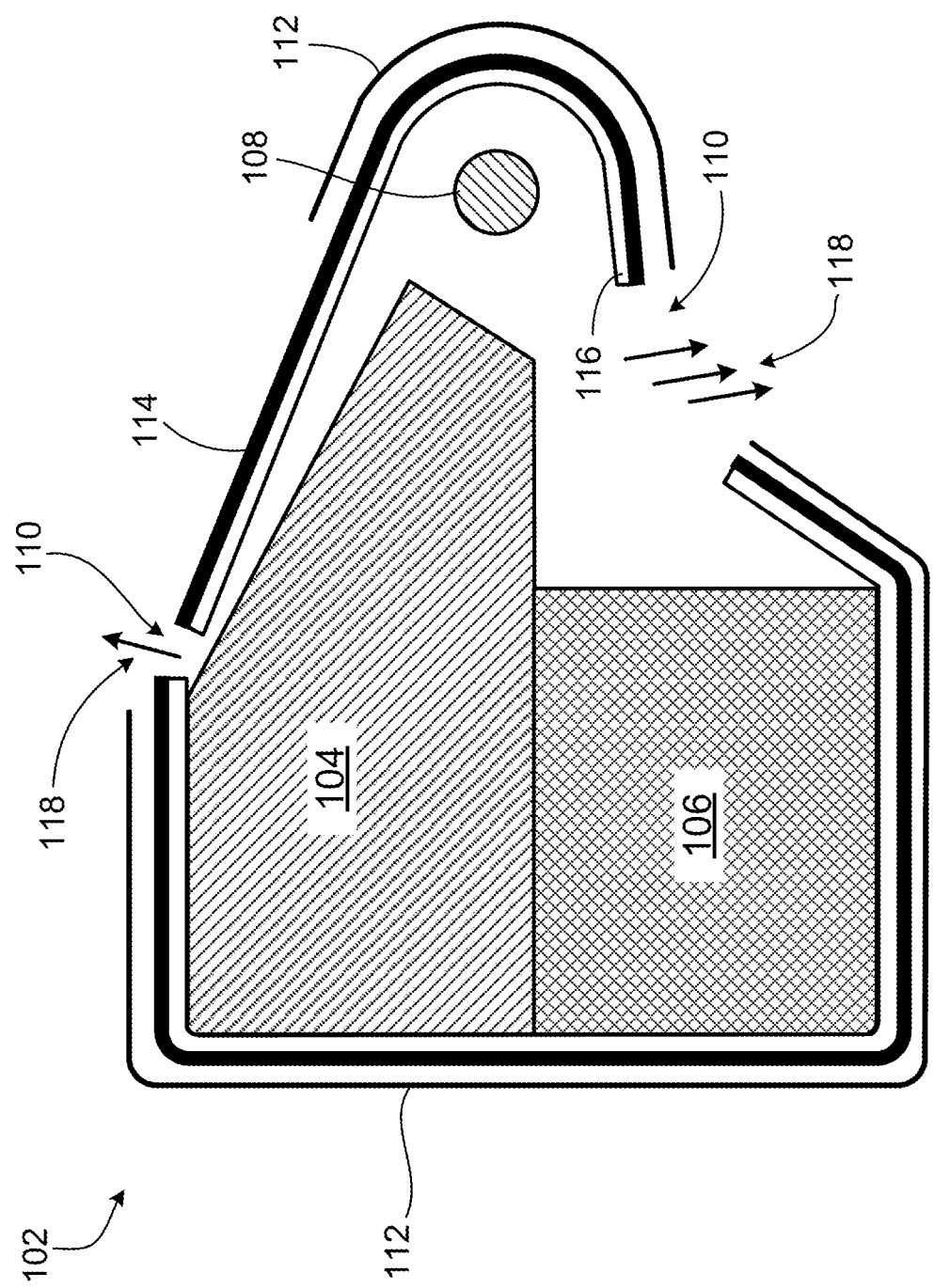
FIG. 1 depicts a schematic of an example eyepiece, according to embodiments of the present disclosure.

Embodiments of the present disclosure are directed to an optical device, such as an eyepiece, including an edge sealant for reducing light contamination, a lamination dam to restrict the wicking of the edge sealant between layers of the optical device, and venting gaps in the sealant and dam to allow outgassing from the interior of the eyepiece and to prevent pressure differences from occurring. The gaps can permit air to flow between the interior and exterior of the eyepiece, preventing defects and/or deformation that may otherwise be caused by chemical reactions and/or pressure differentials.

An eyepiece can be constructed to include multiple layers of waveguides as described below. During manufacture of the eyepiece, an edge sealant (e.g., polymer) can be applied along at least a portion of the perimeter of the eyepiece. The sealant can subsequently be cured using ultraviolet (UV) light that is directed at the edge sealant. The eyepiece can also be manufactured to include a lamination dam that restricts the sealant material from wicking between the layers of the eyepiece beyond a particular depth, before the sealant material has completely cured. In some examples, the edge sealant is applied to the optical device to prevent, or at least reduce, the leakage of light from the optical device, and also to ensure and maintain the structure of the multi-layer optical device. In some examples, the optical device is an eyepiece that has been manufactured for use in a virtual reality, augmented reality, and/or computer vision interface device, and/or to deliver image data, video data, graphics data, and/or other types of visually perceivable information to a user who is wearing or otherwise using the interface device. The sealant may be applied to absorb light coming out of the eyepiece, and to prevent light from reflecting back into the eyepiece and degrading its optical performance.

The sealant can be applied to at least a portion of the edge of the eyepiece, with application across the entire thickness of the eyepiece, across all the layers of the multi-layer eyepiece. Once the sealant is applied to the multi-layer structure, the sealant begins wicking between the layers of the eyepiece. Accordingly, curing of the sealant can be initiated shortly following (e.g., immediately following) the completion of the sealant application. Various factors can contribute to the amount of wicking that occurs (e.g., the wicking length), including: the particular material used for the sealant, and its viscosity: the delay before curing begins: and/or incoming material variation such as the air gap size between the layers in the eyepiece. For example, the smaller the air gap between the layers, the more wicking may occur due to capillary effect. In some embodiments, the curing and sealant application can be consistent so that all parts of the sealant (e.g., all portions of the edge) may have the same or substantially the same wicking time. In some embodiments, a lamination dam is arranged between the layers of the eyepiece to stop the wicking of the sealant at a particular depth, as described further below.

In some embodiments, one or more (e.g., ultraviolet) light sources (probes) can be employed to cure the sealant. For example, the sealant can be a black UV-sensitive polymer that cures when exposed to UV light for a length of time. Use of the sealant can enhance the optical performance of the eyepieces with respect to brightness and/or contrast, while also providing mechanical strength and structural integrity to the multi-layer structure of the eyepiece.

If the sealant is applied continuously along the entire eyepiece perimeter, without any gap(s) in the sealant and lamination dam, the eyepiece's optical performance (e.g., with respect to contrast, efficiency, etc.) can degrade over time due to the accumulation of defects. Such defects can be caused when chemicals that are produced through the outgassing of the sealant and/or dam material react with chemicals that are present in the eyepiece, such as chemicals in the surface of the optics layers. The defects can accumulate over time onto the optical grating of each optics layer, leading to optical aberrations during eyepiece operations (e.g., double images, blurring, ghost images, etc.). Moreover, without the gap(s) the optics layers can deform over time due to differences in the trapped air gap pressure caused by altitude and/or temperature change. Such pressure differences can manifest between layers in the interior of the eyepiece, and/or between the interior and exterior of the eyepiece, and can cause substantial mechanical deformation of the eyepiece structure.

Embodiments employ one or more venting gaps through both the dam and sealant, which allow the flow of air between the interior and exterior of the eyepiece. Through use of the gap(s), embodiments allow the flow of outgassed chemicals to the exterior of the eyepiece, thus reducing the contamination of the optical grating as described above. The gap(s) also allow for the equilibration of air pressure across layers and between the interior and exterior of the eyepiece, thus reducing or eliminating the mechanical deformation caused by pressure difference over time. The gap(s) in dam and sealant can be provided in substantially same location(s) in the dam and sealant coverage along the perimeter of the eyepiece, to permit airflow: For example, a gap in the sealant can be co-centered or otherwise overlap at least partially with a gap in the dam. In some embodiments, there may be a difference in the width of the gap in the dam compared to the width of the gap in the sealant, as described further below; to avoid wicking of sealant through the gap in the dam and into the interior of the eyepiece.

Eyepieces with and without the gap(s) were tested and compared, and testing verified that use of the gap(s) helps reduce defect deposition on the gratings of the optics layers, thus improving optical key performance indicators (KPIs) such as contrast and efficiency. Through a mechanical simulation of an eyepiece without a vent, it was determined that the layers of the eyepiece may deform as much as 95 micrometers by pressurizing the inside and outside to sea level, then setting the outside pressure to the air pressure at 10,000 feet altitude, and finally, back to sea level. This deformation may introduce cross talk between optical layers causing double images or ghost images in the optical display. Use of the gap(s) improves eyepiece performance by reducing or preventing the instances of defect deposition and pressure-based deformation of the eyepiece.

In some embodiments, the materials used for the lamination dam and edge seal adhesives, and for the surface of the optical layer, may be hydrophobic to avoid water condensation that may otherwise occur between the layers when the gap(s) are present. The lamination dam, in some embodiments, is a curable optical glue dispensed over spacers of a designated height (for example, 50 microns, but dependent upon optical design). In some embodiments, the curable glue incorporates spacer beads itself. Spacer beads may be glass or polymer to match refractive index requirements and structural requirements.

In some embodiments, the eyepiece comprises a suspension of a polymer glue and soda-lime-silica glass beads, wherein the glass beads are present to maintain an air gap as well as maintain an offset between an interior and exterior of the optical device. The offset is defined by the size of the glass beads and present to enhance the mechanical properties of the layers by decreasing warp and bow as well as increasing mechanical strength. In some embodiments, the lamination dam suspension has a viscosity equal to or greater than 70,000 centipoise (cP) at room temperature. In some embodiments, a dimension of the soda-lime-silica glass beads are equal to or greater than 20 microns.

FIG. 1 depicts a schematic of a top-down view of an example eyepiece 102, according to embodiments of the present disclosure. As shown in this example, the eyepiece 102 can include various eyepiece grating regions including an orthogonal pupil expander (OPE) region 104, an exit pupil expander (EPE) region 106, and an incoupling grating (ICG) region 108. The eyepiece 102 can include a sealant 114 (also described as an edge seal or edge sealant) around at least a portion of the perimeter of the eyepiece 102, as described above. The eyepiece 102 can also include a lamination dam 116 (also described as a dam) that is arranged between the layers of the eyepiece 102 to stop the wicking of the sealant material that may occur before the sealant has completely cured. The eyepiece 102 can include one or more venting gaps 110 (also described as gap(s)) in the sealant 114 and dam 116, the gap(s) 110 allowing for the flow of air between the interior and exterior of the eyepiece 102. Such flow can permit the outgassing 118 of gas that is produced during the curing of the sealant and/or dam material, and prevent the occurrence of pressure differentials that may cause physical deformation of the eyepiece layers.

In some embodiments, a portion of the perimeter of the eyepiece 102 can be characterized as a critical region 112, also described as a critical optical path. Along the critical path, the presence of the sealant absorbs light along the edge of the eyepiece 102 and prevents optical aberrations, as described above. Accordingly, the gap(s) 110 can be located along the perimeter at position(s) that are not within the critical region, because gap(s) in the critical region could cause optical aberrations due to light reflecting back into the eyepiece. The eyepiece 102 can include any suitable number of gap(s) 110, and each gap 110 can be of a suitable length. Each gap 110 can include both a gap in the sealant and a gap in the dam. The gap 110 may be approximately the same position and length in both the dam 116 and the sealant 114, to provide adequate air flow through both the dam 116 and sealant 114. In some embodiments, the length of the gap 110 may differ somewhat between the dam 116 and the sealant 114, as described further below.

Figure 2:
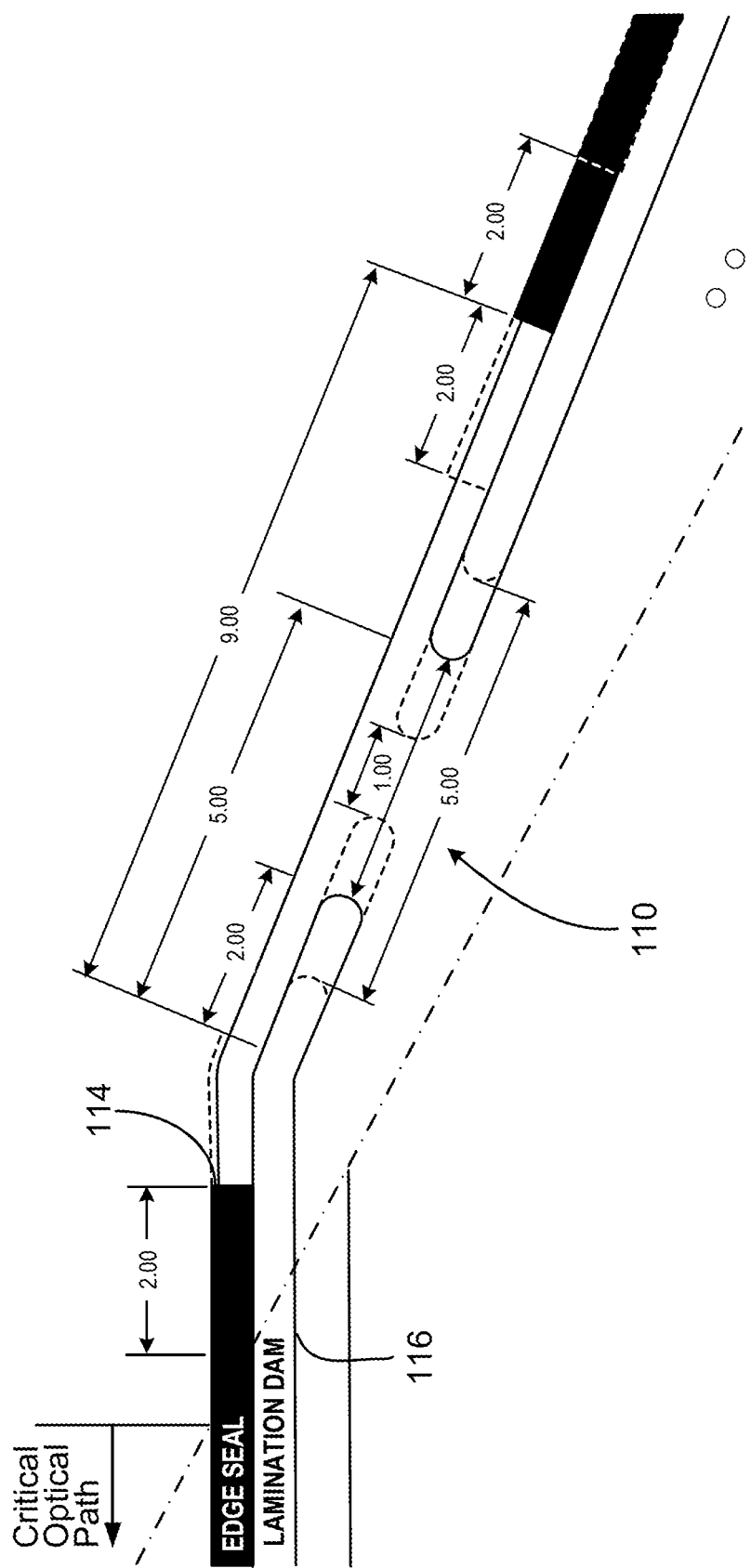
FIG. 2 depicts a schematic of a portion of an example eyepiece, according to embodiments of the present disclosure.

FIG. 2 depicts a schematic of a portion of an example eyepiece 102, according to embodiments of the present disclosure. The particular dimensions and tolerances shown in FIG. 2 (in millimeters) are provided as examples, and embodiments are not limited to the example dimensions and tolerances shown. The dashed lines show variation in positioning of gaps 110 in sealant 114 and dam 116. FIG. 2 illustrates embodiments in which the eyepiece 102 includes one or more gaps 110 that allow the flow of air through both the sealant 114 and the dam 116. In some embodiments, as shown in this example, the length of the gap 110 through the sealant 114 is different than the length of the gap 110 through the dam 116. For example, the length of the gap 110 through the dam 116 can be less than the length of the gap 110 through the sealant 114. The length difference may be to inhibit the sealant 114 from wicking through the gap in the dam 116 into the interior of the eyepiece 102. As also shown, the gap 110 in the sealant 114 can begin in a location that is outside the critical region of the eyepiece perimeter.

In one example, the edge seal and lamination dam gaps are co-centered at 4 mm away from the OPE top corner. The vent gap size can be 3 mm, and can vary between a minimum of 1 mm and a maximum of 5 mm. The lamination vent gap can be positioned with accuracy specified as +1 mm, and the edge seal vent gap can be positioned with accuracy specified #2 mm. In some embodiments, the edge seal vent gap size can be determined based on the lamination dam vent gap size. The edge seal vent gap can have a 1 mm safe zone from the edge of the lamination dam vent gap, to prevent the sealant from leaking into the dam vent gap. The edge seal can remain within the critical region or critical optical path (e.g., with an endpoint defined by intersection of extension line of the OPE grating and glass edge as depicted by the dot-dash line), avoiding the presence of gap(s) in the critical region.

Figure 3:
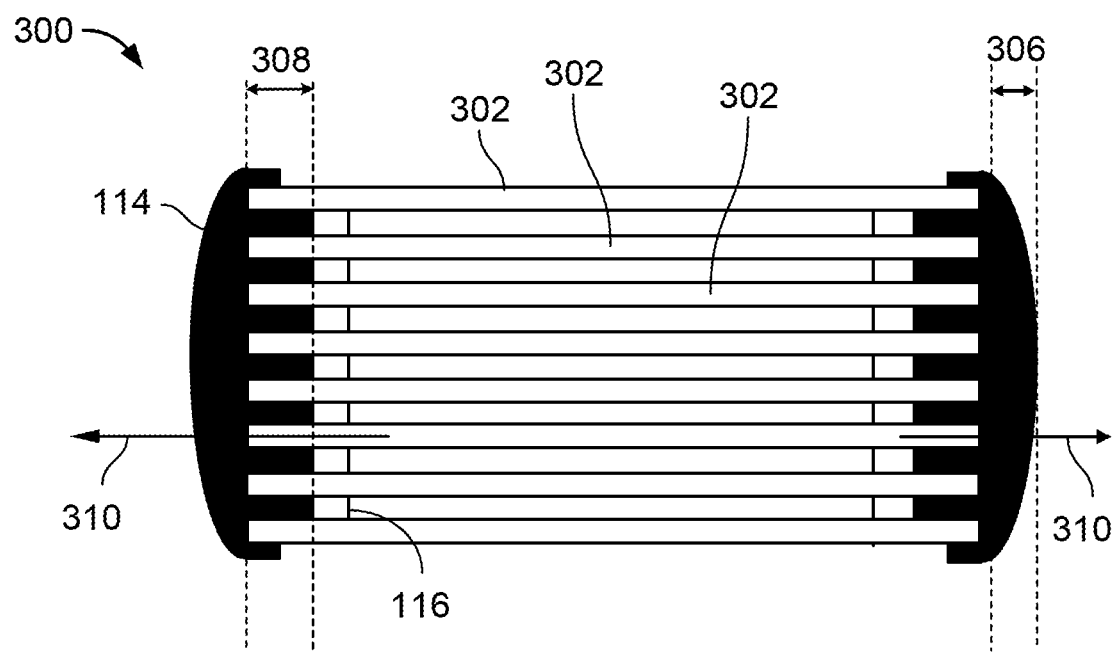
FIG. 3 depicts a cross-section schematic of an example optical device that can be inspected using the inspection apparatus, according to embodiments of the present disclosure.

FIG. 3 depicts a cross-section schematic 300 of an example optical device 102 (e.g., eyepiece), according to embodiments of the present disclosure. The view shown is of a cross-section of an example eyepiece. As shown, the eyepiece can include multiple layers 302 that each provide a waveguide for a particular wavelength band of light. For example, different layers may be designed to guide red, green, or blue light. An edge sealant 114 may be applied to the edge of the eyepiece as shown, to attempt to prevent light leakage 310 from the interior to the exterior of the eyepiece in a transverse direction through the edge. The edge sealant 114 may also prevent reflection of light back into the interior of the eyepiece. The edge sealant 114 may be applied with an appropriate thickness 306, and may penetrate (through wicking) into the eyepiece, between the layers 302, to an appropriate depth 308. The eyepiece may be composed of multiple layers of (e.g., high index) glass in a stack. A dam 116 can also be used to halt the wicking of the sealant 114. As shown in the example, the dam 116 can be arranged between the layers 302 at a particular depth 308 relative to the edge of the eyepiece 102, to halt the wicking of the sealant 114 at the depth 308.

The venting gaps described herein can be used in any suitable type of optical device. In some examples, the eyepiece may be created at least in part using Jet and Flash Imprint Technology (J-FIL™), developed by Molecular Imprints™. The J-FIL technique may be used to create diffraction gratings on the layers of the glass of the eyepiece to create waveguide displays. Each layer may be a thin layer of glass with polymer gratings created on its surface using J-FIL. The diffraction gratings may provide the basic working functionality of the eyepiece. Once the diffraction gratings are formed onto a large, broad glass layer, the glass layer may be laser cut into the shape of the eyepiece. Each layer of glass may be a different color, and there may be multiple depth planes. A larger number of planes may provide for a better virtual experience for a user using the eyepiece. The layers may be stacked using the sealant polymer (e.g., glue dots or line), and the whole stack may be sealed using the sealant. Air gaps between the layers may be preserved for the optical performance of the eyepiece. The gaps between the layers may have controlled dimensions (e.g., substantially uniform width). The edge sealant polymer may be applied around the edge of the layered structure to seal the stack and air gaps from the outside environment. The edge seal glue also provides a physical lock to ensure mechanical integrity of the structure, while preventing outside particle contamination and/or reducing the likelihood of moisture buildup. Without such a seal, the layers may fall apart and delaminate from one another. The gap between layers may be of any suitable width to achieve the desired optical functionality.

The use of the sealant enables creation of high contrast eyepieces by absorbing stray light that hits the edges of the eyepiece layers. The sealant also provides structural integrity for (e.g., "locks in") the mechanical gap and co-planarity of the eyepieces. The eyepiece may have any suitable number of layers 302 of glass or other material, and each layer may act as a waveguide to allow the passage of various frequencies of light. Layers may be configured for particular wavelengths, so as to propagate light of a particular color, and the eyepiece may be configured for a particular optical power, to create a number of depth planes at which light through the waveguide may be perceived. For example, a first set of waveguide layers may include layers for red, green, and blue at a first depth plane, and a second set of waveguide layers may include a second set of layers for red, green, and blue light corresponding to a second depth plane. The order of the colors may be arranged differently in different depth planes to achieve the desired optical effects in the eyepiece. In some embodiments, a single (e.g., blue) layer may cover multiple depth planes. In some examples, the edge sealant may be a glue, resin, polymer sealant, ink, and/or other viscous material. The edge sealant may be black. Blackening an edge of the multi-layer eyepiece may cause the absorption of light impinging on the edge, and/or provide for reduced reflection of light impinging on the edge.

Figure 4:
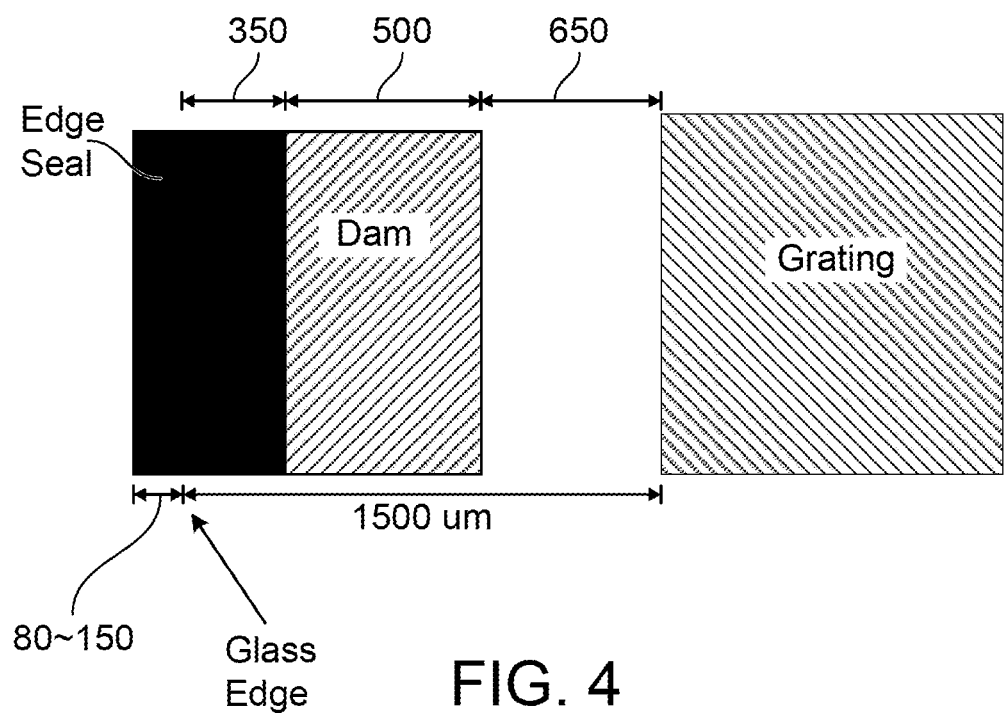
FIG. 4 depicts an example dam arrangement in an eyepiece, according to embodiments of the present disclosure.

FIG. 4 depicts an example dam arrangement in an eyepiece, according to embodiments of the present disclosure. The units shown are microns. For example, the thickness of the sealant from the edge of the glass can be 80-150 microns, and the wicking depth of the sealant can be 350 microns until the wicking is halted by the dam. The dam can be 500 microns wide, and separated from the grating boundary of the eyepiece by a gap that is 650 microns wide. The distance between the edge of the glass and the grating boundary can be 1500 microns (1.5 mm). Other suitable dimensions can also be employed.

Figure 5:
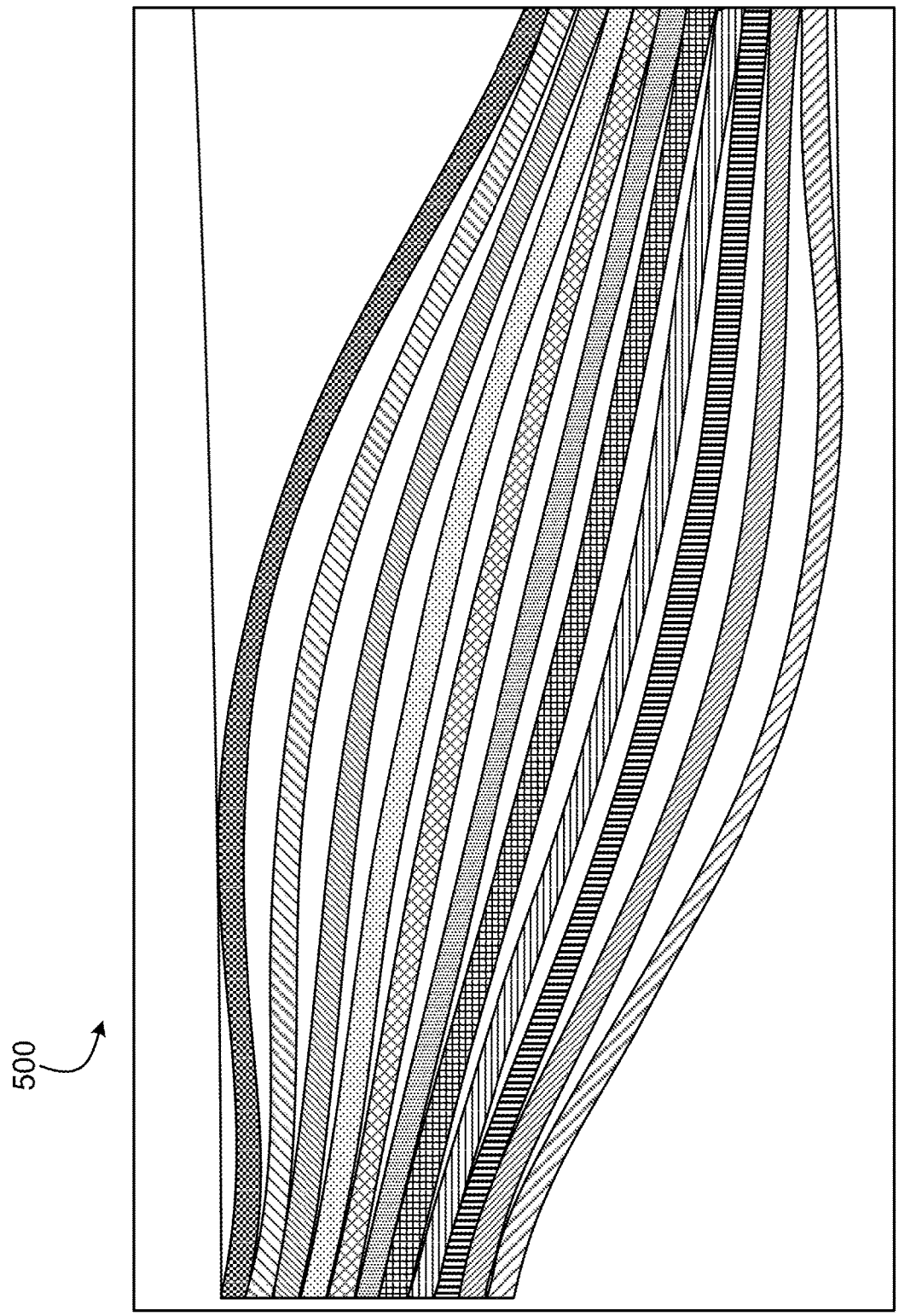
FIG. 5 depicts a schematic showing example deformation of layers of an eyepiece, such as in the absence of vent(s).

FIG. 5 depicts a schematic showing example deformation of layers of an eyepiece 500, such as in the absence of vent(s). For example, an eyepiece can include a 250 micron optical layer, with 25 micron spacing, 9 depth planes, 2 cover glass layers, and 11 layers total. In test conditions, the environment inside and outside the eyepiece was initially pressurized to sea level pressure. The outside air pressure was set to the air pressure at 10,000 feet altitude, and then back to sea level pressure. As a result, the differential pressure caused some out of plane deformation of the layers in the eyepiece, up to 95 microns of out-of-plane deformation.

Figures 6A, 6B:
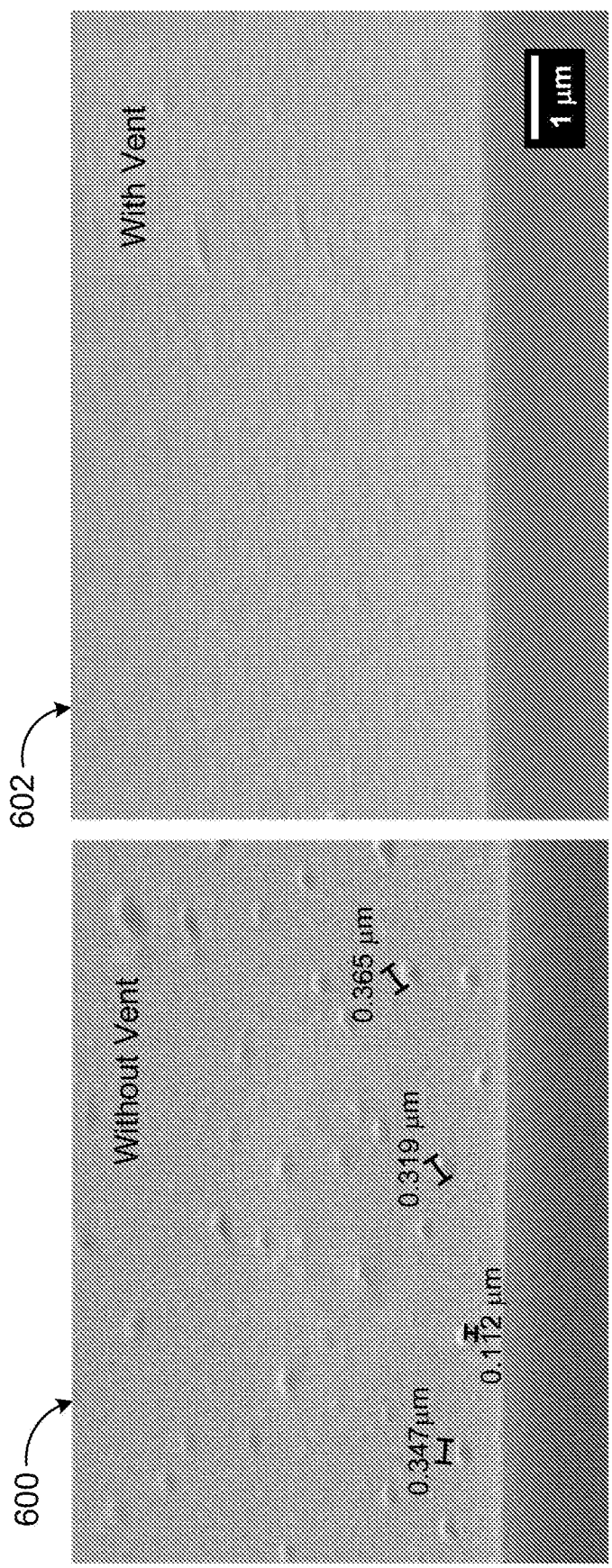
FIGS. 6A and 6B are scanning electron microscope (SEM) images showing eyepiece deformation without vents and with vents, respectively, according to embodiments of the present disclosure.

FIGS. 6A and 6B are scanning electron microscope (SEM) images showing eyepiece defects without and with vent(s), respectively, according to embodiments of the present disclosure. In the example of FIG. 6A, image 600 shows a scanning electron microscope (SEM) image of an eyepiece region (e.g., the region between OPE and EPE) without vent(s), after 1000 hours of a heat and humidity test, exposing the eyepiece to 65 degrees Celsius and 95% relative humidity. Image 602 in FIG. 6B shows an SEM image of the eyepiece region in an eyepiece that includes vent(s), subjected to similar test conditions. As shown, the presence of vent(s) dramatically reduces and/or eliminates the incidence of contamination defects in the eyepiece.

While this specification contains many specific details, these should not be construed as limitations on the scope of the disclosure or of what may be claimed, but rather as examples of features that are associated with particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

A number of embodiments have been described. Nevertheless, it will be understood that various modifications may be made without departing from the spirit and scope of the disclosure. For example, various structures shown above may be used, with elements rearranged, positioned differently, oriented differently, added, and/or removed. Accordingly, other embodiments are within the scope of the following claims.

What is claimed is:

1. An optical device comprising:
    a plurality of optics layers;
    an edge sealant arranged along an edge of the optical device across the plurality of optics layers, wherein one or more sealant gaps are present in the edge sealant; and
    a lamination dam arranged between each pair of adjacent optics layers of the plurality of optics layers to stop wicking of the edge sealant, between the optics layers, at a distance from the edge of the optical device, wherein one or more dam gaps are present in the lamination dam at one or more positions along the edge that each corresponds to a position of a respective sealant gap to allow air flow between an interior and an exterior of the optical device through the one or more sealant gaps and the one or more dam gaps,
    wherein one of the one or more sealant gaps has a length along the edge of the optical device exceeding that of the corresponding dam gap.

2. The optical device of claim 1, wherein the one or more sealant gaps are located outside a critical region of the edge of the optical device.

3. The optical device of claim 1, wherein one or more of the edge sealant, the lamination dam, and a surface of one of the optics layers of the plurality of optics layers is at least partly composed of a hydrophobic material.

4. The optical device of claim 1, wherein at least one of the one or more sealant gaps at least partially overlaps with the corresponding one of the one or more dam gaps along the edge of the optical device.

5. The optical device of claim 1, wherein at least one of the one or more sealant gaps is co-centered with the corresponding one of the one or more dam gaps.

6. The optical device of claim 1, wherein:
the edge sealant includes at least two sealant gaps; and
the lamination dam includes at least two dam gaps.

7. The optical device of claim 1, wherein the plurality of optics layers comprises at least three optics layers.

8. The optical device of claim 7, wherein the at least three optics layers comprise a layer to guide red light, a layer to guide green light, and a layer to guide blue light.

9. The optical device of claim 1, wherein the edge sealant absorbs ultraviolet radiation.

10. The optical device of claim 1, wherein at least one of the optics layers of the plurality of optics layers comprises an orthogonal pupil expander region.

11. The optical device of claim 1, wherein at least one of the optics layers of the plurality of optics layers comprises an exit pupil expander region.

12. The optical device of claim 1, wherein at least one of the optics layers of the plurality of optics layers comprises an ingrating coupling region.

13. The optical device of claim 1, wherein the one or more sealant gaps and the one or more dam gaps allow for a flow of air between an interior of the optical device and an exterior of the optical device.

14. The optical device of claim 1, wherein the edge sealant prevents light leakage from an interior to an exterior of the optical device in a transverse direction through the edge of the optical device.

15. The optical device of claim 1, wherein the edge sealant prevents reflection of light into an interior of the optical device.

16. The optical device of claim 1, wherein a thickness of the edge sealant is in a range between about 430 microns and about 500 microns.

17. The optical device of claim 1, wherein a thickness of the edge sealant between the edge of the optical device and the lamination dam is about 350 microns.

18. The optical device of claim 1, wherein a width of the lamination dam is about 500 microns.

19. An eyepiece comprising the optical device of claim 1.

* * * * *